(12) United States Patent
Yasuno et al.

(10) Patent No.: US 8,302,322 B2
(45) Date of Patent: Nov. 6, 2012

(54) DETECTOR AND MEASURING DEVICE

(75) Inventors: Junsuke Yasuno, Hiroshima (JP);
Hideki Sindo, Hiroshima (JP)

(73) Assignee: Mitutoyo Corporation, Kanagawa (JP)

( * ) Notice: Subject to any disclaimer, the term of this patent is extended or adjusted under 35 U.S.C. 154(b) by 162 days.

(21) Appl. No.: 12/879,311

(22) Filed: Sep. 10, 2010

(65) Prior Publication Data
US 2011/0083335 A1    Apr. 14, 2011

(30) Foreign Application Priority Data
Oct. 13, 2009    (JP) ................. 2009-236127

(51) Int. Cl.
*G01B 5/012*    (2006.01)
*G01B 5/20*    (2006.01)
*G01B 7/012*    (2006.01)

(52) U.S. Cl. ................. 33/556; 33/558; 33/561

(58) Field of Classification Search ........... 33/556, 33/557, 558, 559, 560, 561, 572; 73/105
See application file for complete search history.

(56) References Cited

U.S. PATENT DOCUMENTS

| | | | | |
|---|---|---|---|---|
| 4,074,438 A | * | 2/1978 | Takeda | 33/561 |
| 5,517,307 A | * | 5/1996 | Buehring et al. | 356/494 |
| 6,164,124 A | * | 12/2000 | Fujii et al. | 73/105 |
| 6,487,897 B1 | * | 12/2002 | Fujii et al. | 73/105 |
| 6,901,678 B2 | * | 6/2005 | Kubota | 33/551 |

FOREIGN PATENT DOCUMENTS

| | | | | |
|---|---|---|---|---|
| DE | 2835615 A | * | 2/1980 | |
| DE | 102004044348 B3 | * | 4/2006 | |
| GB | 2247528 A | * | 3/1992 | |
| JP | 11248404 A | * | 9/1999 | |
| JP | 2004077437 A | * | 3/2004 | |
| JP | 2004-233131 | | 8/2004 | |
| JP | 2004354289 A | * | 12/2004 | |

* cited by examiner

*Primary Examiner* — R. A. Smith
(74) *Attorney, Agent, or Firm* — Greenblum & Bernstein, P.L.C.

(57) ABSTRACT

A detector includes a stylus, a holding portion that holds a proximal end portion of the stylus, a body portion that supports the holding portion rotatably about a rotational axis, and a sensor that detects a rotational displacement of the holding portion. The holding portion includes an abutting member, on which the proximal end portion of the stylus abuts, and a plate spring that biases the proximal end portion of the stylus against the abutting member. The abutting member includes a groove portion on which the proximal end portion of the stylus abuts, and a semispherical portion that extends toward the plate spring, compared with a bottom of the groove portion. The stylus includes a proximal end inclined portion at the proximal end portion of the stylus. The proximal end inclined portion is inclined toward the plate spring, with a decreasing distance from the rotational axis.

10 Claims, 7 Drawing Sheets

DETECTOR AND MEASURING DEVICE

CROSS-REFERENCE TO RELATED APPLICATIONS

The present application claims priority under 35 U.S.C. §119 of Japanese Application No. 2009-236127, filed on Oct. 13, 2009, the disclosure of which is expressly incorporated by reference herein in its entirety.

BACKGROUND OF THE INVENTION

1. Field of the Invention

The present invention relates to a detector and a measuring device having the detector.

2. Description of Related Art

Conventionally, a detector for a measuring device is known. The measuring device includes a rod-like stylus having a contact, which is configured to contact an object to be measured (hereinafter "measured object"), at a tip portion thereof; a holding portion that holds a proximal end portion of the stylus; a body portion that supports the holding portion rotatably about a predetermined rotational axis; and a sensor that detects a rotational displacement of the holding portion. The measuring device detects a displacement of the tip portion of the stylus (hereinafter, simply referred to as a displacement of a stylus) based on the rotational displacement of the holding portion (See, for example, Related Art 1). A probe (detector) described in Related Art 1 includes a stylus, a stylus holder (holding portion), and a probe body (body portion), and detects a displacement of the stylus based on a rotational displacement of the stylus holder. A roundness measuring device having the probe moves the probe in a predetermined direction (hereinafter, "measuring direction") to bring a gauge head (contact) of the stylus into contact with a measured object, thereby displacing the stylus, and measures the measured object based on the displacement of the stylus detected by the probe.

The probe described in Related Art 1 further has a contact switch to detect a rotation of the stylus holder in a direction opposite to the measuring direction. When the switch detects the displacement of the stylus in the direction opposite to the measuring direction, the roundness measuring device performs an operation, such as stopping the movement of the probe, etc., to prevent breakage of the probe caused by a collision with the measured object. However, according to the probe described in Related Art 1, since the probe is required to have the additional switch, the number of components increases, and manufacturing costs increase. Moreover, since an additional space is necessary to provide the switch to the probe, the size of the probe increases. On the other hand, it is conceivable to prevent the breakage of the detector caused by a collision with an measured object, based on the displacement of the stylus detected by the sensor. By doing so, since the detector is not required to have an additional component, manufacturing costs can be reduced, and the detector can be downsized.

FIG. 6 is a schematic diagram illustrating a configuration of a conventional detector 100. As shown in FIG. 6, the detector 100 includes a rod-like stylus 100 having a contact 111, which is configured to contact a measured object, at a tip portion thereof; a holding portion 120 that holds a proximal end portion of the stylus 110; a body portion 130 that supports the holding portion 120 rotatably about a predetermined rotational axis P; and a sensor 140 that detects a rotational displacement of the holding portion 120. In FIG. 6, the body portion 130 is shown in phantom for purposes of illustration.

The holding portion 120 is provided with an abutting member 121, a plate spring 122 and a support member 123. The abutting member 121 has a groove portion 121A on which the proximal end portion of the stylus 110 abuts. The plate spring 122 is positioned to face the abutting member 121 in a direction perpendicular to the axis of the stylus 110 and the rotational axis P (horizontal direction in FIG. 6), and serves as a biasing member that biases the proximal end portion of the stylus 110 against the groove portion 121A. The support member 123 supports the abutting member 121 and the plate spring 122, and is rotatably supported by the body portion 130. The sensor 140 is provided with a core 141 attached to the support member 123, and two coils 142 attached to the body portion 130. The sensor 140 detects a rotational displacement of the holding portion 120 by detecting a displacement of the core 141 using a differential transformation method.

FIGS. 7A and 7B are views each illustrating a state when the stylus 110 is brought into contact with the measured object W. FIG. 7A shows a state when the stylus 110 is brought into contact with the measured object W by moving the detector 100 in a direction (hereinafter, "contact direction") perpendicular to the axis of the stylus 110 and the rotational axis P. FIG. 7B shows a state when the stylus 110 is brought into contact with the measured object W by moving the detector 100 along the axial direction of the stylus 110.

When the stylus 110 is brought into contact with the measured object W by moving the detector 100 in the contact direction, as shown in FIG. 7A, the stylus 100 is displaced, and the core 141 is displaced along with the rotation of the holding portion 120. Therefore, the sensor 140 can detect the displacement of the stylus 110 based on the rotational displacement of the holding portion 120. Accordingly, the measuring device can prevent breakage of the detector 100 caused by the collision with the measured object W, by performing an operation such as, for example, stopping the movement of the detector 100, when the displacement of the stylus 110 is greater than a predetermined threshold.

[Related Art 1] Japanese Patent Application Publication No. 2004-233131.

However, when the stylus 110 is brought into contact with the measured object W, by moving the detector 100 in the axial direction of the stylus 110, as shown in FIG. 7B, the stylus 110 is not displaced. Therefore, the sensor 140 cannot detect the displacement of the stylus 110. Accordingly, the measuring device cannot perform an operation such as stopping the movement of the detector 100, and thus cannot prevent breakage of the detector 100 caused by a collision with the measured object W.

SUMMARY OF THE INVENTION

The present invention provides a detector that can prevent breakage of the detector caused by a collision with a measured object, or the like, without attaching an additional component to the detector, even if the stylus is brought into contact with the measured object, or the like, by moving the detector in the axial direction of the stylus. The present invention further provides a measuring device having such a detector.

An aspect of the present invention provides a detector for a measuring device, including a rod-like stylus having a contact at a tip portion thereof, the contact being configured to contact a measured object; a holding portion that holds a proximal end portion of the stylus; a body portion that supports the holding portion rotatably about a predetermined rotational axis; and a sensor that detects a rotational displacement of the holding portion. The detector detects a displacement of the tip portion of the stylus based on the rotational displacement of the holding portion. The holding portion includes an abutting member that has a groove portion on which the proximal end portion of the stylus abuts; and a biasing member that is positioned to face the abutting member in a direction perpendicular to an axis of the stylus and the rotational axis, and biases the proximal end portion of the stylus against the groove portion. The abutting member includes an extending portion that is positioned adjacent to the groove portion in an extending direction of the groove portion and on a side of the rotational axis with respect to the groove portion, and extends toward the biasing member, compared to a bottom of the groove portion. The stylus includes a proximal end inclined portion at the proximal end portion of the stylus. The proximal end inclined portion is inclined toward the biasing member, with a decreasing distance from the rotational axis.

According to the aspect of the present invention, since the proximal end portion of the stylus is held between the groove portion of the abutting member and the biasing member, when the stylus is brought into contact with the measured object by moving the detector in an axial direction of the stylus and thus a force is applied to the stylus from a tip portion side to a proximal end portion side of the stylus, the stylus slides toward the rotational axis side along the groove portion. When the stylus slides toward the rotational axis side along the groove portion, the proximal end inclined portion slides up the extending portion of the abutting member, and thus the proximal end portion of the stylus moves toward the biasing member side. At this time, since the tip portion of the stylus contacts the measured object, the movement of the tip portion of the stylus is suppressed, by a friction force. In other words, since the holding portion rotates about the rotational axis, the force applied to the stylus from the tip portion side to the proximal end portion side of the stylus can be converted to the rotational displacement of the holding portion. Accordingly, since the sensor can detect the force applied to the stylus from the tip portion side to the proximal end portion side of the stylus, as the displacement of the stylus, even when the stylus is brought into contact with the measured object, or the like, by moving the detector in the axial direction of the stylus, breakage of the detector caused by the collision with the measured object, or the like, can be prevented, without attaching an additional component to the detector.

The stylus may further include an intermediate inclined portion at an intermediate portion thereof. The intermediate inclined portion is inclined toward the abutting member, with a decreasing distance from the rotation axis. A length of the stylus from a proximal end of the stylus to the intermediate inclined portion is shorter than a length from an end of the groove portion opposite to the rotational axis to the extending portion.

According to this configuration, since the length from the proximal end of the stylus to the intermediate inclined portion is shorter than the length from the end of the groove portion opposite to the rotational axis to the extending portion, when the stylus slides along the groove portion toward the rotational axis side, the intermediate portion first slides up the groove portion and thus the proximal end portion of the stylus moves toward the abutting member side. Next the proximal end portion slides up the extending portion, and the proximal end portion of the stylus moves toward the biasing member side. In other words, the holding portion rotates about the rotation axis in two directions, respectively. Thus, even when the sensor is configured to detect a displacement of the stylus only in one of the two contact directions, the sensor can detect the force applied to the stylus from the tip portion side to the proximal end portion side of the stylus, as the displacement of the stylus. Accordingly, the convenience of the detector can be improved.

Another aspect of the present invention provides a measuring device including the above-described detector. According to this aspect of the present invention, since the measuring device includes the above-described detector, the functions and effects similar to those of the above-described detector can be achieved.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

First Embodiment

Figure 1:
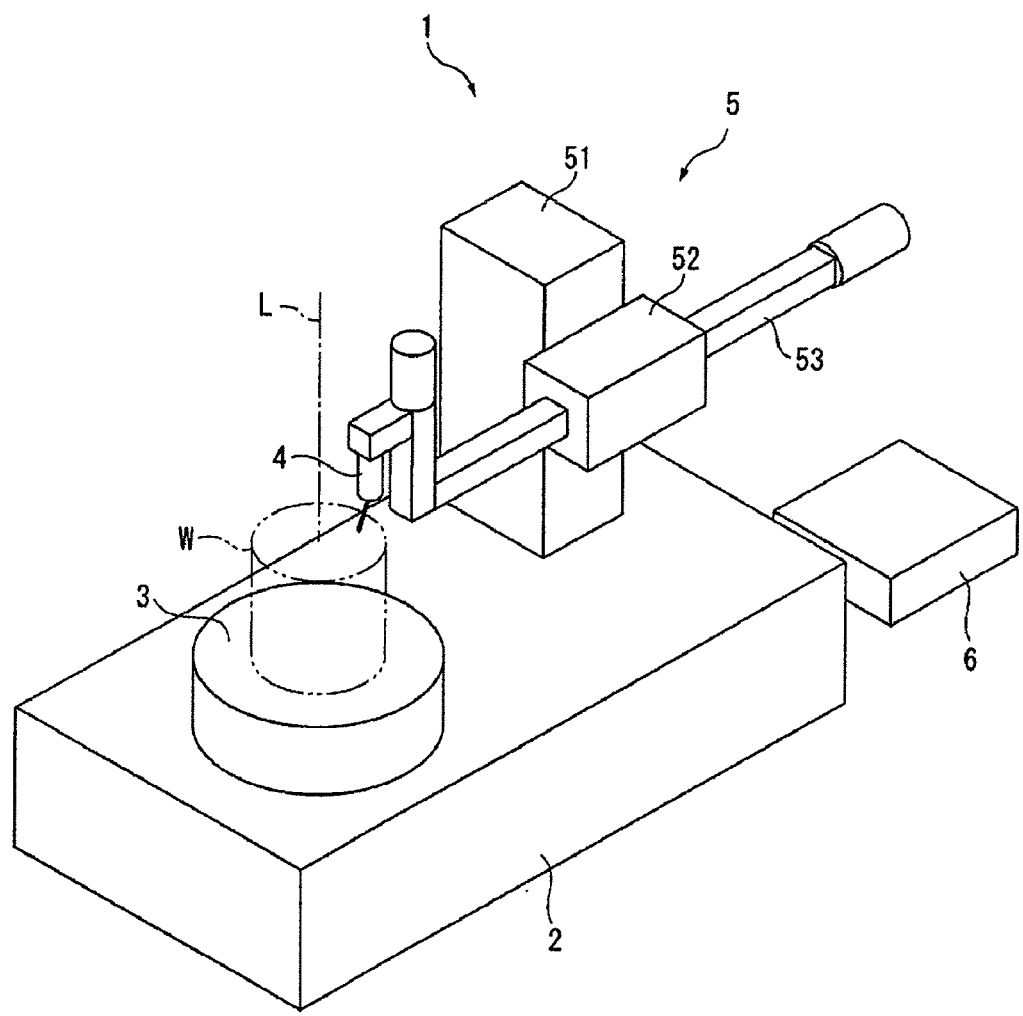
FIG. 1 is a schematic diagram illustrating a roundness measuring device according a first embodiment of the present invention.

A first embodiment of the present invention will be described hereinafter with reference to the drawings. FIG. 1 is a schematic diagram illustrating a roundness measuring device 1 according to the first embodiment of the present invention. The roundness measuring device 1 includes, as shown in FIG. 1, a base 2, a rotation table 3, a detector 4, a moving mechanism 5 and a controller 6. The rotation table 3 is provided on an upper surface of the base 2 and is rotatable about a predetermined rotational axis L (a dashed line shown in FIG. 1). The detector 4 detects a position of a surface of an measured object W, which is placed on an upper surface of the rotation table 3. The moving mechanism moves the detector 4. The controller 6 controls the entire roundness measuring device 1. The roundness measuring device 1 measures the roundness of the measured object W, by moving the detector 4 and brings it in contact with the measured object W, by the moving mechanism 5, under the control of the controller 6.

The rotation table 3 rotates about the rotational axis L, by being driven by a driving mechanism (not shown), including a motor, etc., provided inside the base 2, under the control of the controller 6. The moving mechanism 5 includes a column 51, a slider 52 and an arm 53. The column 51 is provided to stand on the base 2. The slider 52 is supported by the column 51, and is vertically movable with respect to the upper surface of the base 2. The arm 53 is supported by the slider 52, and is horizontally movable toward and away from the rotation table 3. The detector 4 is attached to an end of the arm 53 at the side of the rotation table 3. Further, the moving mechanism 5 is driven by a driving mechanism (not shown), including a motor, etc., provided inside the column 51 or the slider 52, and thereby moves the detector 4, under the control of the controller 6.

Figure 2:
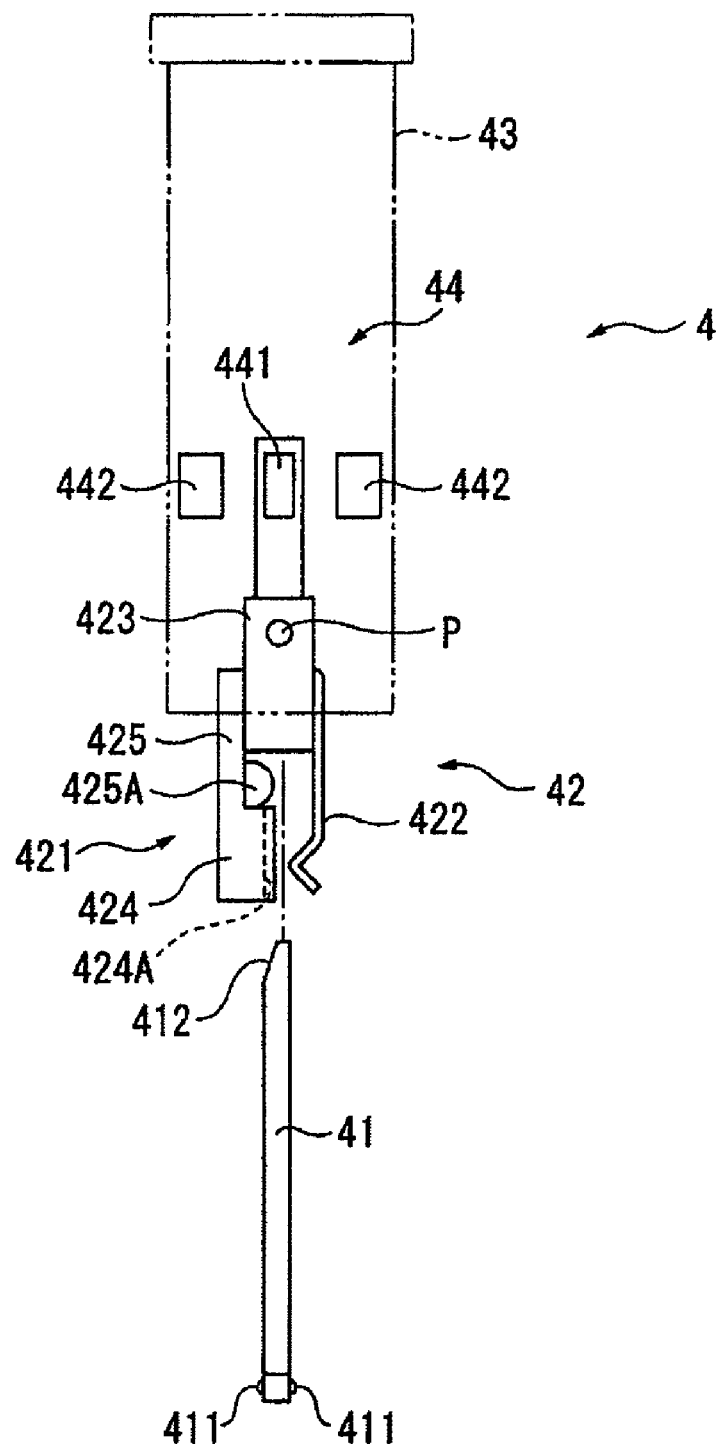
FIG. 2 is a schematic diagram illustrating a detailed configuration of a detector according to the first embodiment of the present invention.

FIG. 2 is a schematic diagram illustrating a detailed configuration of the detector 4. The detector 4 includes, as shown in FIG. 2, a rod-like stylus 41, a holding portion 42, a body portion 43 and a sensor 44. The stylus 41 has a contact 411, which is configured to contact the measured object W, at the tip portion thereof. The holding portion 42 holds the proximal end portion of the stylus 41. The body portion 43 supports the holding portion 42 rotatably about a predetermined rotational axis P. The sensor 44 detects a rotational displacement of the holding portion 42. In FIG. 2, the body portion 43 is shown in phantom for purposes of illustration. The same applies to the following drawings. The holding potion 42 includes an abutting member 421, on which the proximal end portion of the stylus 41 abuts, a plate spring 422 and a support member 423. The plate spring 422 is positioned to face the abutting member 421 in a contact direction (horizontal direction in FIG. 2), which is a direction perpendicular to the axis of the stylus 41 and the rotational axis P, and serves as a biasing member that biases the proximal end portion of the stylus 41 against the abutting member 421. The support member 423 supports the abutting member 421 and the plate spring 422, and is rotatably supported by the body portion 43.

The abutting member 421 has a generally L-shaped cross-section, having a wide portion 424 at the stylus 41 side, and a narrow portion 425 at the rotational axis P side. The wide portion 424 has a groove portion 424A, on which the proximal end portion of the stylus 41 abuts. The narrow portion 425 has a semispherical portion 425A that extends toward the plate spring 422 side, compared with the bottom of the groove portion 424A. In other words, in this embodiment, the semispherical portion 425A may be regarded as an extending portion. Further, a proximal end inclined portion 412 (also referred to as a "proximal tapered portion") is provided at the proximal end portion of the stylus 41. The proximal end inclined portion is inclined toward the plate spring 422 side, with a decreasing distance from the rotational axis P. In other words, the proximal end inclined portion 412 extends toward a proximalmost end of the stylus 41. The sensor 44 includes a core 441 attached to the support member 423, and two coils 442 attached to the body portion 43. The sensor 44 detects the rotational displacement of the holding portion 42 by detecting the displacement of the core 441 using the differential transformation method.

Figure 3A:
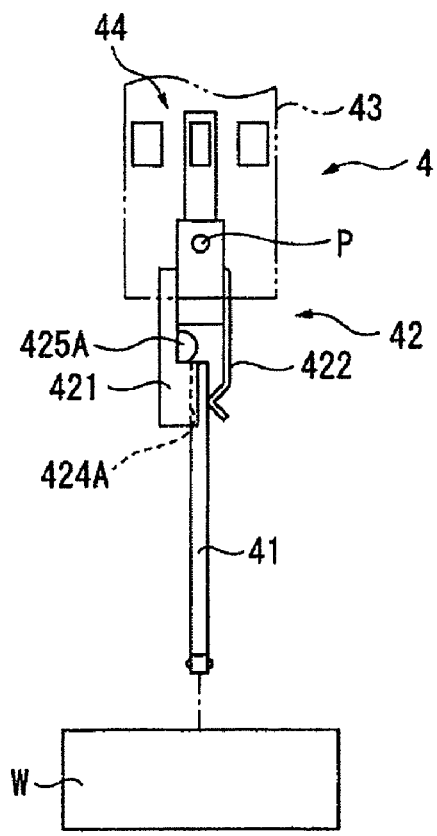
FIGS. 3A and 3B are views each illustrating a movement of a stylus when the stylus is brought into contact with a measured object according to the first embodiment of the present invention.
Figure 3B:
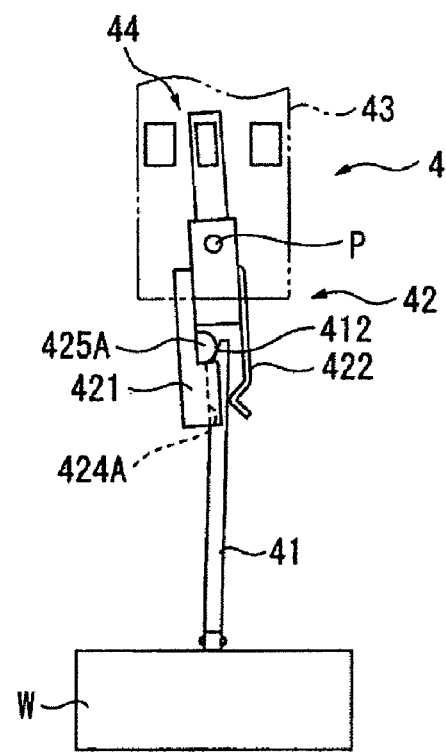

FIGS. 3A and 3B are views each illustrating a movement of the stylus 41 when the stylus 41 is brought into contact with the measured object W. FIG. 3A shows a state before the detector 4 is moved. FIG. 3B shows a state when the stylus 41 is brought into contact with the measured object W, by moving the detector 4 in the axial direction of the stylus 41. As shown in FIG. 3A, the proximal end portion of the stylus 41 is held between the groove portion 424A of the abutting member 421 and the plate spring 422. Therefore, when the stylus 41 is brought into contact with the measured object W by moving the detector 4 in the axial direction of the stylus 41, and a force is applied to the stylus 41 from the tip portion side to the proximal end portion side of the stylus 41, the stylus 41 slides toward the rotational axis P side along the groove portion 424A.

When the stylus 41 slides along the groove portion 424A toward the rotational axis P side, the proximal end inclined portion 412 slides up the semispherical portion 425A, as shown in FIG. 3B. Thus, the proximal end portion of the stylus 41 moves toward the plate spring 422 side. At this time, since the tip portion of the stylus 41 contacts the measured object W, the movement of the tip portion is suppressed by a frictional force. In other words, the holding portion 42 rotates about the rotational axis P. Thus, the force applied to the stylus 41 from the tip portion side to the proximal end portion side of the stylus 41 can be converted into a rotational displacement of the holding portion 42. Accordingly, the sensor 44 can detect the force applied to the stylus 41 from the tip portion side to the proximal end portion side of the stylus 41, as a displacement of the stylus 41. Then, the controller 6 performs an operation such as, for example, stopping the movement of the detector 4, when the displacement of the stylus 41 is greater than a predetermined threshold.

The following effects can be achieved according to the above-described embodiment. (1) Since the roundness measuring device 1 has a sensor 44 and the sensor 44 can detect the force applied to the stylus 41 from the tip portion side to the proximal end portion side of the stylus 41, as a displacement of the stylus 41, breakage of the detector 4 caused by a collision with the measured object W, or the like, can be prevented, without attaching an additional component to the detector 4, even when the stylus 41 is brought into contact with the measured object W, or the like, by moving the detector 4 in the axial direction of the stylus 41.

Second Embodiment

Figure 4:
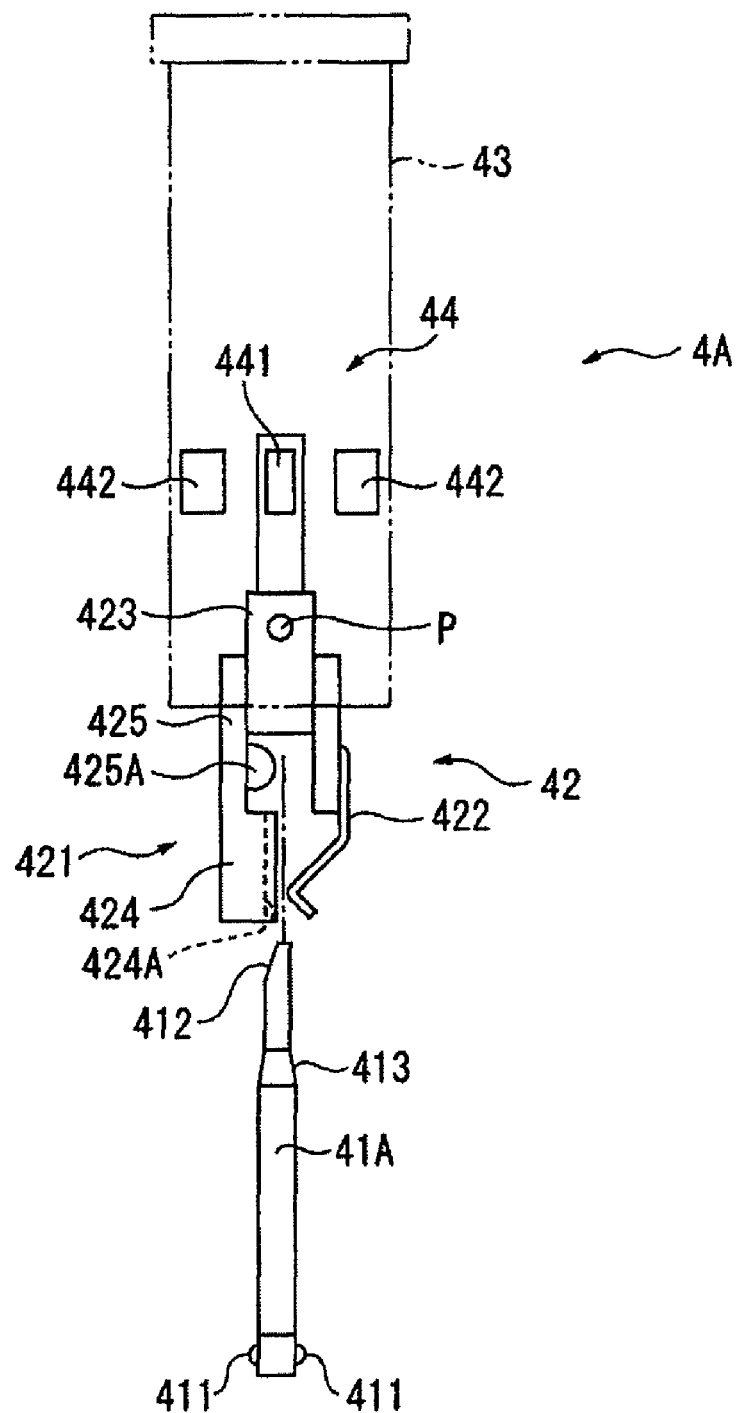
FIG. 4 is schematic diagram illustrating a detailed configuration of a detector according to a second embodiment of the present invention.

A second embodiment of the present invention will be described hereinafter with reference the drawings. FIG. 4 is schematic diagram illustrating a detailed configuration of a detector 4A according to the second embodiment of the present invention. As shown in FIG. 4, this embodiment is different from the first embodiment in that the detector 4A has a stylus 41A, and a tapered portion 413 is provided at an intermediate portion of the stylus 41A. In the following description, the portions that have been described will be denoted by the same reference characters, and description thereof will be omitted. The tapered portion 413 has a diameter increasing with the increasing distance from the rotational axis P. In other words, in this embodiment, the tapered portion 413 may be regarded as an intermediate inclined portion, which is provided to be inclined toward the abutting member 421 side, with the increasing distance from the rotational axis P. In other words, the tapered portion 413 is inclined toward the tip of the stylus 41A. Further, the length from the proximal end of the stylus 41A to the tapered portion 413 is shorter than the length from an end of the groove portion 424A opposite to the rotational axis P to the semispherical portion 425A.

Figure 5A:
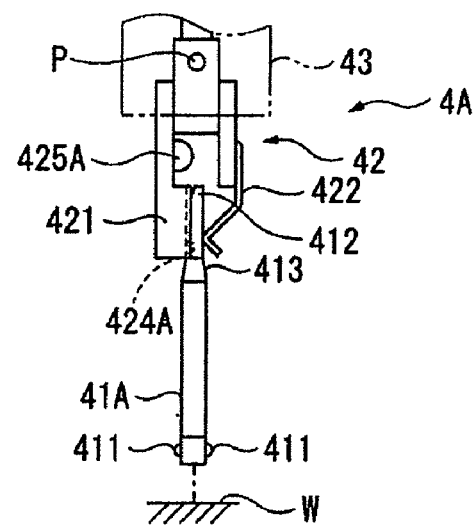
FIGS. 5A-5C are views each illustrating a movement of a stylus when the stylus is brought into contact with a measured object according to the second embodiment of the present invention.
Figure 5B:
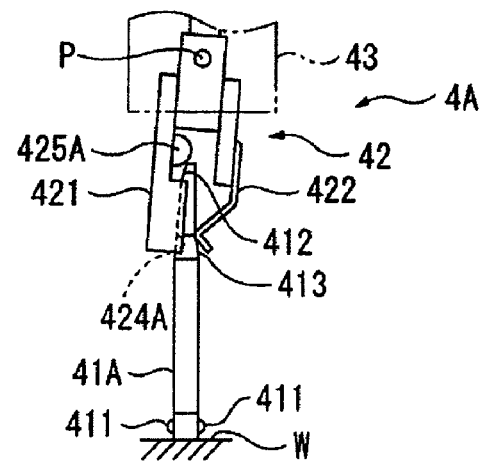
Figure 5C:
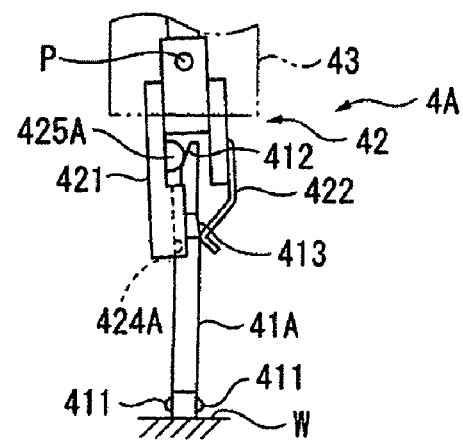
Figure 6:
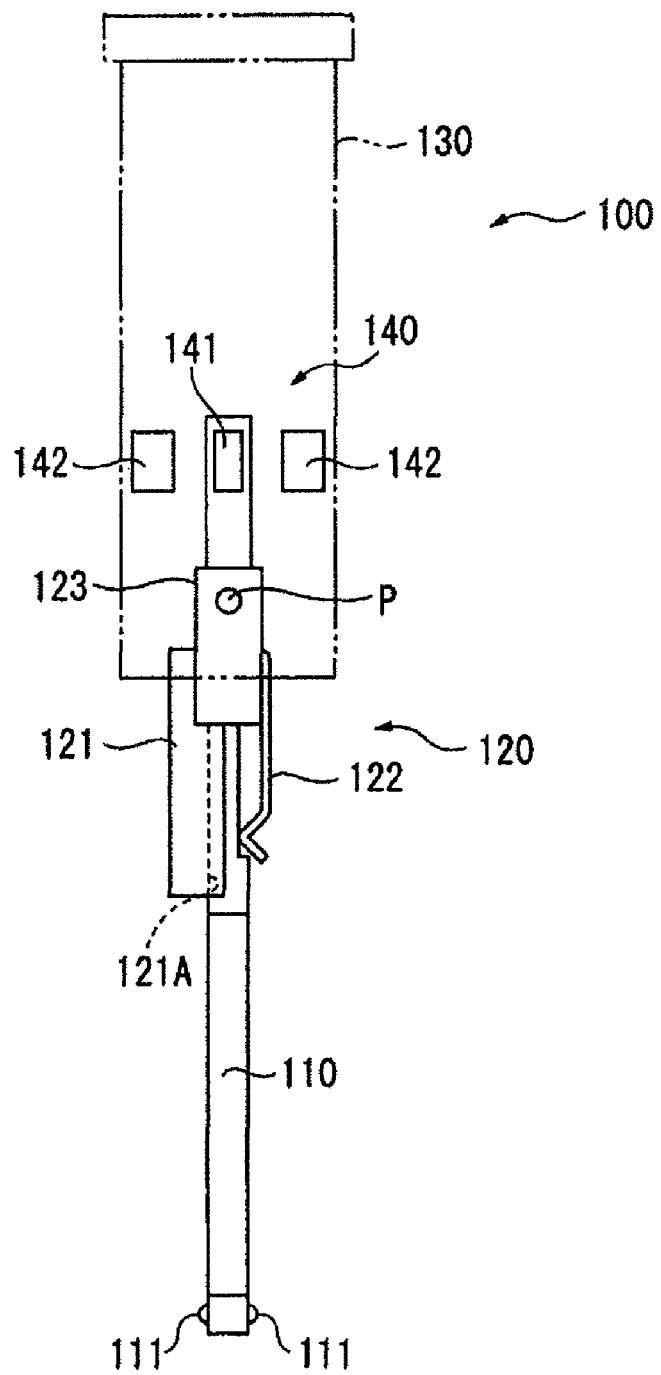
FIG. 6 is a schematic diagram illustrating a configuration of a conventional detector.
Figure 7A:
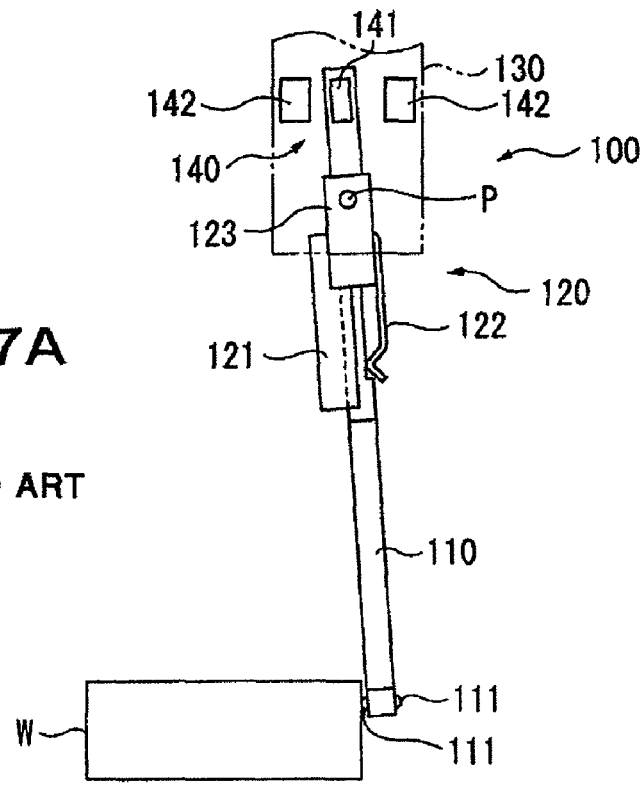
FIGS. 7A and 7B are views each illustrating a state when a stylus is brought into contact with the measured object.
Figure 7B:
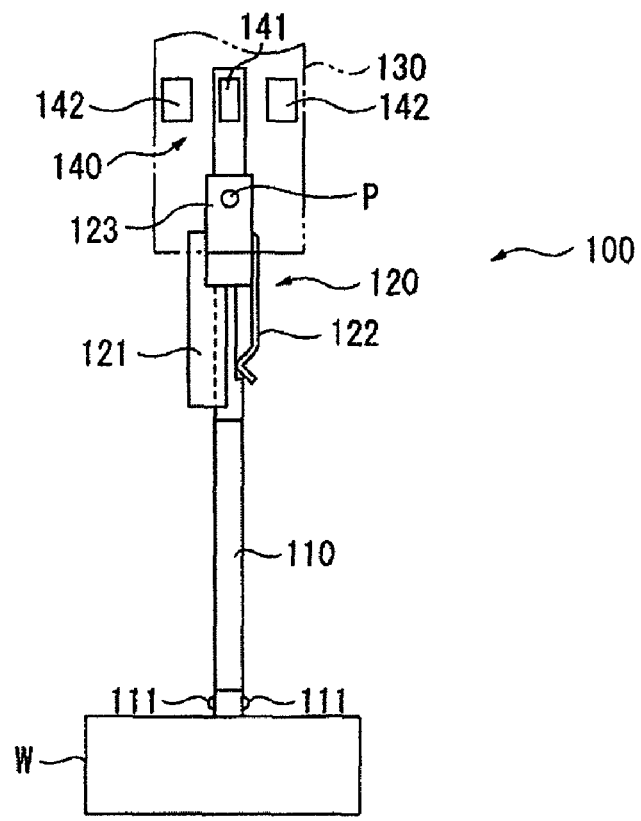

FIGS. 5A-5C are views each illustrating a movement of a stylus 41A when the stylus 41A is brought into contact with the measured object W. FIG. 5A is a view illustrating a state before the detector 4A is moved. FIG. 5B is a view illustrating a state when the stylus 41A is brought into contact with the measured object W, by moving the detector 4A in the axial direction of the stylus 41A. FIG. 5C is a view illustrating a state after the detector 4A is further moved from the state shown in FIG. 5B. When the stylus 41A is brought into contact with the measured object W by moving the detector 4A in the axial direction of the stylus 41A, and thus a force is applied to the stylus 41A from the tip portion side to the proximal end portion side of the stylus 41A, the stylus 41A slides along the groove portion 424A toward the rotational axis P side, as shown in FIGS. 5A and 5B.

When the stylus 41A slides along the groove portion 424A toward the rotational axis P side, since the length from the proximal end of the stylus 41A to the tapered portion 413 is shorter than the length from the end of the groove portion 424A opposite to the rotational axis P to the semispherical portion 425A, the tapered portion 413 first slides up the groove portion 424A, as shown in FIG. 5B. Thus, the proximal end portion of the stylus 41A moves toward the abutting portion 421 side. Next, as shown in FIG. 5C, the proximal end inclined portion 412 slides up the semispherical portion 425A, and thus the proximal end portion of the stylus 41A moves toward the side of the plate spring 422. In other words, the holding portion 42 rotates about the rotational axis P, in two directions, respectively.

According to this embodiment, functions and effects similar to those of the first embodiment can be achieved, and following functions and effects can be further achieved. (2) Even when the sensor 44 is configured to detect a displacement of the stylus 41A only in one of the two contact directions, the sensor 44 can detect the force applied to the stylus 41A from the tip portion side to the proximal end portion of the stylus 41A, as a displacement of the stylus 41A. Accordingly, the convenience of the detector 4A can be improved.

The present invention is not limited to the above-described embodiments, and any modification or improvement that falls in the range that achieves the objective of the present invention is included in the present invention. For example, in the above-described embodiments, the extending portion is configured with the semispherical portion 425A; but may be configured to have another shape. In other words, the extending portion can be any portion that is provided adjacent to the groove portion in the extending direction of the groove portion and on the rotational axis side with respect to the groove portion, and that extends toward the biasing member side, compared with the bottom of the groove portion. In the above-described embodiment, an intermediate inclined portion is configured with the tapered portion 413, but may be configured to have another shape. In other words, the intermediate inclined portion can be any portion that is provided at the intermediate portion of the stylus, and is inclined toward the abutting member side, with an increasing distance from the rotational axis. In the above-described embodiments, the roundness measuring device 1 is illustrated as an example of a measuring device; however, another measuring device, such as a three-dimensional measuring device, etc., may be used.

The present invention can be preferably used as a detector and a measuring device having the detector.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A detector for a measuring device comprising:
  a rod-shaped stylus comprising a contact at a tip thereof, the contact configured to contact a measured object;
  a holder configured to hold a proximal end of the stylus;
  a body configured to support the holder rotatably about a predetermined rotational axis; and
  a sensor that detects a rotational displacement of the holder, wherein:
    the detector detects a displacement of the tip of the stylus in an axial direction of the stylus based on the rotational displacement of the holder,
    the holder comprises:
      an abutting member comprising a groove on which the proximal end of the stylus abuts; and
      a biasing member positioned to face the abutting member in a direction perpendicular to an axis of the stylus and the rotational axis, and biases the proximal end of the stylus against the groove,
    the abutting member further comprises an extender positioned adjacent to the groove in an extending direction of the groove and on a same side of the rotational axis as the groove, the extender further extending toward the biasing member,
    the stylus comprises a proximal tapered portion at the proximal end of the stylus, the tapered portion extending toward a proximalmost end of the stylus, and
    contact of the proximal tapered portion of the stylus and the extender converts a force applied to the tip of the stylus in the axial direction of the stylus into the rotational displacement of the holder, which is to be detected by the sensor.

2. The detector according to claim 1, wherein:
  the stylus further comprises an intermediate inclined portion at an intermediate portion thereof, the intermediate inclined portion inclined toward the tip of the stylus, and
  a length of the stylus from the proximal end to the intermediate inclined portion is shorter than a length from an end of the groove opposite the rotational axis to the extender.

3. The detector according to claim 2, wherein a diameter of the intermediate inclined portion is greater than a diameter of the proximal tapered portion.

4. A measuring device comprising the detector according to claim 3.

5. A measuring device comprising the detector according to claim 2.

6. A measuring device comprising the detector according to claim 1.

7. The detector according to claim 1, wherein the stylus slides on the groove by the force applied to the tip of the stylus in the axial direction of the stylus toward the extender.

8. The detector according to claim 1, wherein the proximal tapered portion of the stylus slides up the extender by the force applied to the tip of the stylus in the axial direction, and thereby moves toward the biasing member.

9. The detector according to claim 8, wherein the movement of the proximal tapered portion of the stylus toward the biasing member rotates the holder about the predetermined rotational axis.

10. The detector according to claim 1, wherein the extender has a semispherical shape.

* * * * *